(12) United States Patent
Paz

(10) Patent No.: US 9,925,438 B1
(45) Date of Patent: *Mar. 27, 2018

(54) GOLF GREEN REPAIR TOOL

(71) Applicant: Felix Paz, Boca Raton, FL (US)

(72) Inventor: Felix Paz, Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,297

(22) Filed: Aug. 21, 2017

Related U.S. Application Data

(63) Continuation-in-part of application No. 15/366,025, filed on Dec. 1, 2016, now Pat. No. 9,713,755.

(51) Int. Cl.
*A63B 57/50* (2015.01)
*A01B 1/24* (2006.01)

(52) U.S. Cl.
CPC .............. *A63B 57/50* (2015.10); *A01B 1/243* (2013.01)

(58) Field of Classification Search
CPC ........... A63B 57/50; A01B 1/15; A01B 1/165; A01B 1/24
See application file for complete search history.

(56) References Cited

U.S. PATENT DOCUMENTS

| | | | | |
|---|---|---|---|---|
| 2,869,915 A | * | 1/1959 | Good ........................ | A01B 1/24 122/378 |
| 3,168,150 A | * | 2/1965 | Kappler ................... | A01B 1/18 172/21 |
| 4,179,147 A | * | 12/1979 | Mendenhall ........... | A63B 57/50 294/50.7 |
| 4,846,286 A | * | 7/1989 | McNeely ............... | A63B 57/50 172/379 |
| 5,322,130 A | * | 6/1994 | Ryden .................... | A63B 57/50 172/371 |
| 5,730,226 A | * | 3/1998 | Kendall ................... | A01B 1/24 172/371 |
| 6,062,992 A | * | 5/2000 | Hoyt ........................ | A01B 1/24 172/378 |
| 9,713,755 B1 | * | 7/2017 | Paz ........................ | A63B 57/50 |
| 2004/0048694 A1 | * | 3/2004 | Swensen .................. | A01B 1/24 473/408 |
| 2004/0082410 A1 | * | 4/2004 | Noda ...................... | A63B 57/50 473/408 |
| 2004/0219997 A1 | * | 11/2004 | Champion ............. | A63B 57/50 473/408 |
| 2016/0121179 A1 | * | 5/2016 | Fallon ................ | A63B 57/0068 473/408 |
| 2017/0072280 A1 | * | 3/2017 | Perry ...................... | A63B 57/50 |

* cited by examiner

*Primary Examiner* — Steven Wong
(74) *Attorney, Agent, or Firm* — Chris VanDam; Christopher J. VanDam, PA

(57) ABSTRACT

A golf green repair tool having a plurality of spears centered around a plurality of tines. The tines and spears are biased by a spring inside a housing and sleeve. When the cap the housing is pressed by the foot of a greenskeeper or golfer the spring is compressed forcing the tines and spears into the turf. The tines are inserted around the periphery of the ball-mark to aerate and loosen the turf. The spears are inserted into the center of the ball-mark and aerate and pull the bottom of the ball-mark to the level of the surrounding turf. The bottom side of the ground-contacting sleeve pressed down the raised rim of the ball-mark correcting the entire ball-mark to the level of the surrounding turf.

2 Claims, 6 Drawing Sheets

GOLF GREEN REPAIR TOOL

OTHER RELATED APPLICATIONS

The present application is a continuation-in-part of U.S. Pat. No. 9,713,755 issued 25 Jul. 2017 having application Ser. No. 15/366,025 filed on 1 Dec. 2016, which is hereby incorporated in its entirety by reference.

BACKGROUND OF THE INVENTION

1. Field of the Invention

The present invention relates to the sport of golf, and more particularly, to a tool to repair ball-marks in a golf green caused by golf ball impacts during play.

2. Description of the Related Art

Several designs for have been designed in the past. None of them, however, describes a device that gently lifts the bottom of the ball-mark relieving pressure on the turf while simultaneously applying pressure to the raised rim of the ball-mark while also creating a pattern of micro-aerations to help the turf heal rapidly.

Applicant believes that the closest reference corresponds to U.S. Pat. No. 3,168,150 issued to G. O. Kappler. However, it differs from the present invention because Kappler uses "blade-like, soil-penetrating finger(s)" that slice through the periphery of a ground irregularity. This slicing action severs already stressed turf roots and shoots. Further, the Kappler device will open up new scars in the turf, actually causing more damage than would be without any intervention by a greenskeeper with his device.

Applicant also references U.S. Pat. No. 5,322,130 issued to A. Ryden for his Golf Ball Mark Repair Tool. Similar to the Kappler design, Ryden provide for a plurality of fingers that insert into the soil and then dig under the ball-mark to pull up soil. Again, this damages the surrounding turf by cutting the roots and shoots which slows down natural healing of the turf and often results in brown-spots from necrotic grass damages by the tool provided to repair such injury.

Ryden does mention the concept of aeration but apparently only to cast a positive light on the slicing soil wounds opened up by use of his tool. If proper aeration was achieved by the Ryden device they are placed in the wrong location around the periphery of the ball-mark and not in the ball-mark itself where the ball injury occurred.

Kappler, Ryden and all other known comparable prior art references fail to disclose or suggest alone or in combination: a golf green repair tool that raises the bottom of the ball-mark using slender, headed spears inserted into the center of the ball-mark to pull up the ball-mark to normal turf level without slicing any turf while inserting barbless tines through the rest of the ball-mark to aerate the impact area while also depressing the rim to a proper level. Additionally, the presently claimed device does a better job, with fewer moving parts resulting in far more robust device that reduces turf injury healing times.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an effective and durable golf green ball-mark repair tool.

It is another object of this invention to provide a ball-mark repair tool that reduces the natural healing time of green turf after a golf ball caused ball-mark.

It is still another object of the present invention to provide a ball-mark repair tool that repairs a ball-mark without causing further damage to the roots and shoots of a delicate golf green.

It is yet another object of this invention to provide such a device and associated method of use that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
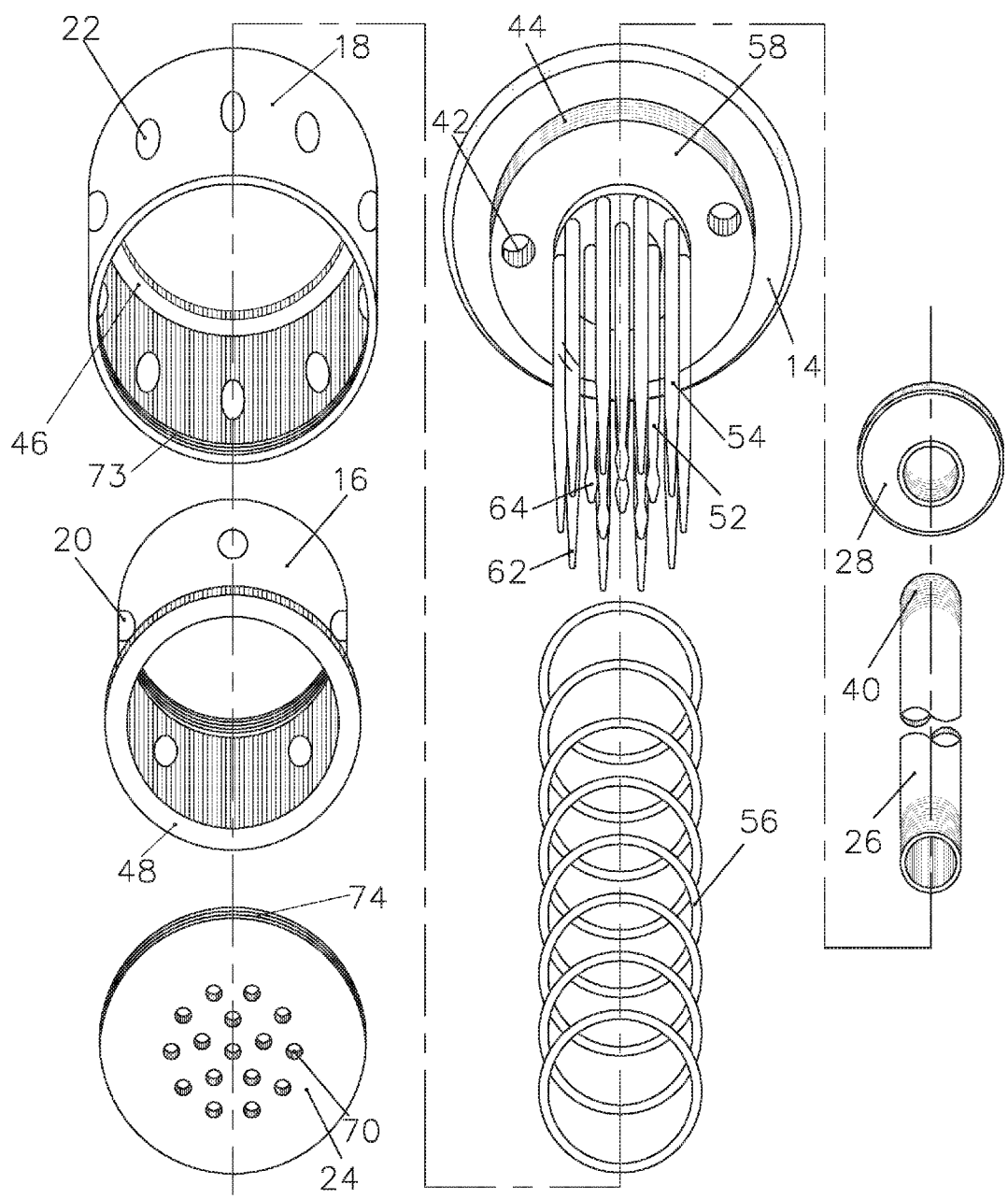
FIG. 1 shows a perspective view of exploded elements of a head assembly of a golf green repair tool.

The subject device and method of use is sometimes referred to as the device, the invention, the golf green repair tool, the ball-mark repair tool, the tool, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation. The device can be used equally by a greenskeeper, groundskeeper, golfer or any other person regardless of such specific terminology used in the examples below.

Ball-marks in a golf green are vexing to golfer and greenskeeper alike. A golfer needs a smooth green, free from imperfections that affect a predictable putt to the cup. The greenskeeper wants to maintain a pristine green. However, when mowing a green with the typical bent grass or Bermuda grass, the rim 34 (seen in FIG. 3) can become shaved off leaving an unattractive annular brown scar of damaged turf. This is both unsightly and injures the tender grass and inhibiting the natural ability of the grass to regrow and heal. Unrepaired or improperly repaired ball-marks can cause brown-spots and bruising in the turf if not properly repaired.

Referring now to the drawings, where the present invention is generally referred to with numeral 10, it can be observed that it basically includes a head assembly 12, a cap 14, a housing 16, a sleeve 18, an aperture 20, an aperture 22, a base 24, a shaft 26, a handle 28, threads 40, an aperture 42, threads 44, a rim 46, a rim 48, an interior 50, spears 52, tines 54, a spring 56, a seat 58, a seat 60, a tip 62 and a tip 64.

Other elements that are not part of the structure of the device but shown in the drawings to illustrate the use and benefits of the device include, but are not limited to, a ball 30, a ball-mark 32, a rim 34, turf 36, soil 38, bores 66, bores 68, apertures 70, threads 73 and threads 74.

During assembly of the tool the spring 56 is placed over the tines 54 and spears 52. The housing 16 is placed into the sleeve 18 and then both are placed over the spring 56 so that the spring 56 on an upper end contacts seat 58 in the cap 14 and on a lower end contacts seat 60 in the sleeve 18. The upper edge of the housing 16 is threaded onto threads 44 on the cap 14 The base 24 having threads 74 is threaded onto threads 73 to enclose the spring 56.

The sleeve 18 is oriented so that the apertures 70 in the base 24 line up with the spears 52 and tines 54 and do not strike the base 24 when using the tool. The shaft 26 is connected to the cap 14 with threads 40. An upper end of the shaft 26 includes a handle 28 comfortable to a user of the device. Spring 56 is located in the interior 50 of the golf green repair tool and naturally biases the rim 48 of the housing 16 against the rim 46 of the sleeve 18. As demonstrated in FIG. 4 when the spring 56 is in its naturally extended state the spears 52 are retracted into the base 24 of the sleeve and the tines 54 are fully retracted or slightly protrude from the base 24 through the apertures 70.

Figure 2:
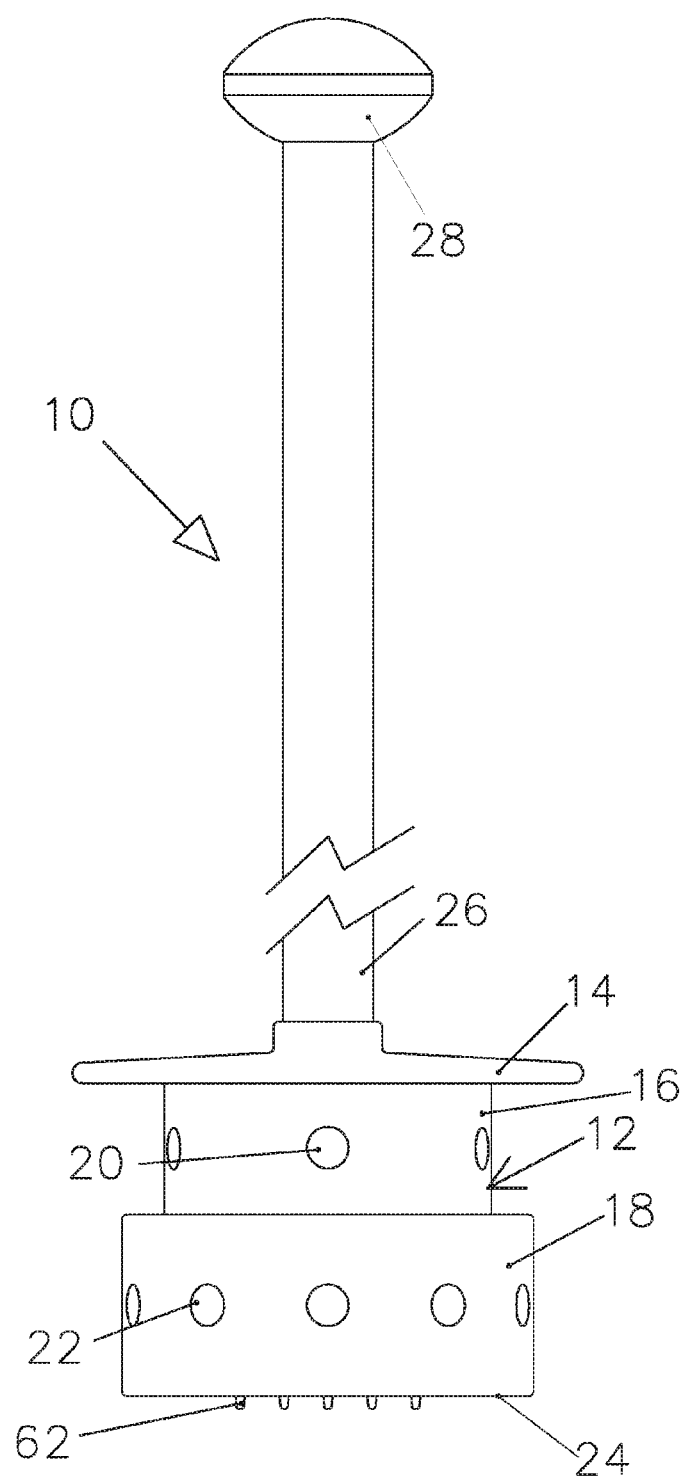
FIG. 2 shows an elevation view of a golf green repair tool.

As seen in FIG. 2, a slight protrusion of the tips 62 of the tines 54 from the base 24 can help align the tool over a ball-mark before applying pressure to the cap 14. Protrusion of the tips 62 of the tines 54 is not required for all versions of the green repair tool.

Apertures 20, apertures 22 apertures 42 are provided both to lighten the tool and to allow an egress for any sand, soil or other debris that enters the interior 50. This greatly reduces the need to clean the tool between uses and extends the working life of the internal parts by reducing friction wear and tear.

Figure 3:
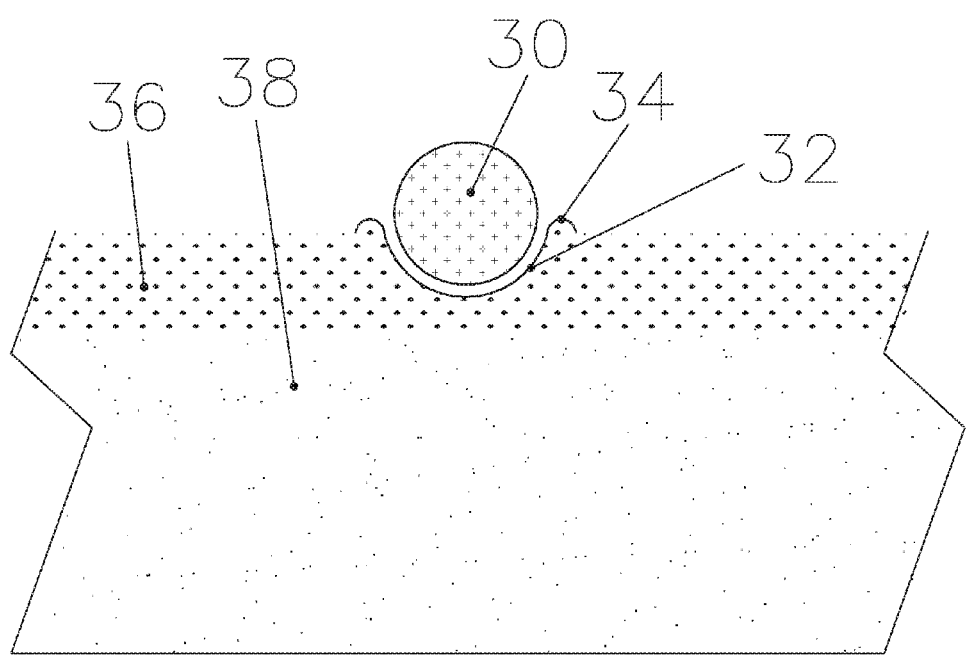
FIG. 3 shows an elevation cross section view of a ball-mark in a golf green.

FIG. 3 shows an example of the anatomy of a typical golf ball 30 and resulting ball-mark 32. When approaching a green during typical play, a golfer may employ a high, arcing shot to drop the ball 30 onto the green with less uncontrolled forward movement. The ball 30 therefore has sufficient downward kinetic energy when striking the turf 36 to cause a depressed ball-mark 32. The turf 36 and soil 38 displaced by the ball-mark 32 form a raised rim 34 encircling the ball-mark 32.

For proper correction and repair of the ball-mark 32 the bottom of the ball-mark 32 must be raised to relieve pressure on the rim 34 while simultaneously allowing the rim 34 to be pressed level with the surrounding unaffected turf. The result is a smooth green favored by golfer and greenskeeper. The present device also provides a subtle aeration without slicing the blades of the turf 36 or root structure in the soil 38, allowing natural healing and repair processes to flourish and return the green to a fine playing surface.

Figure 4:
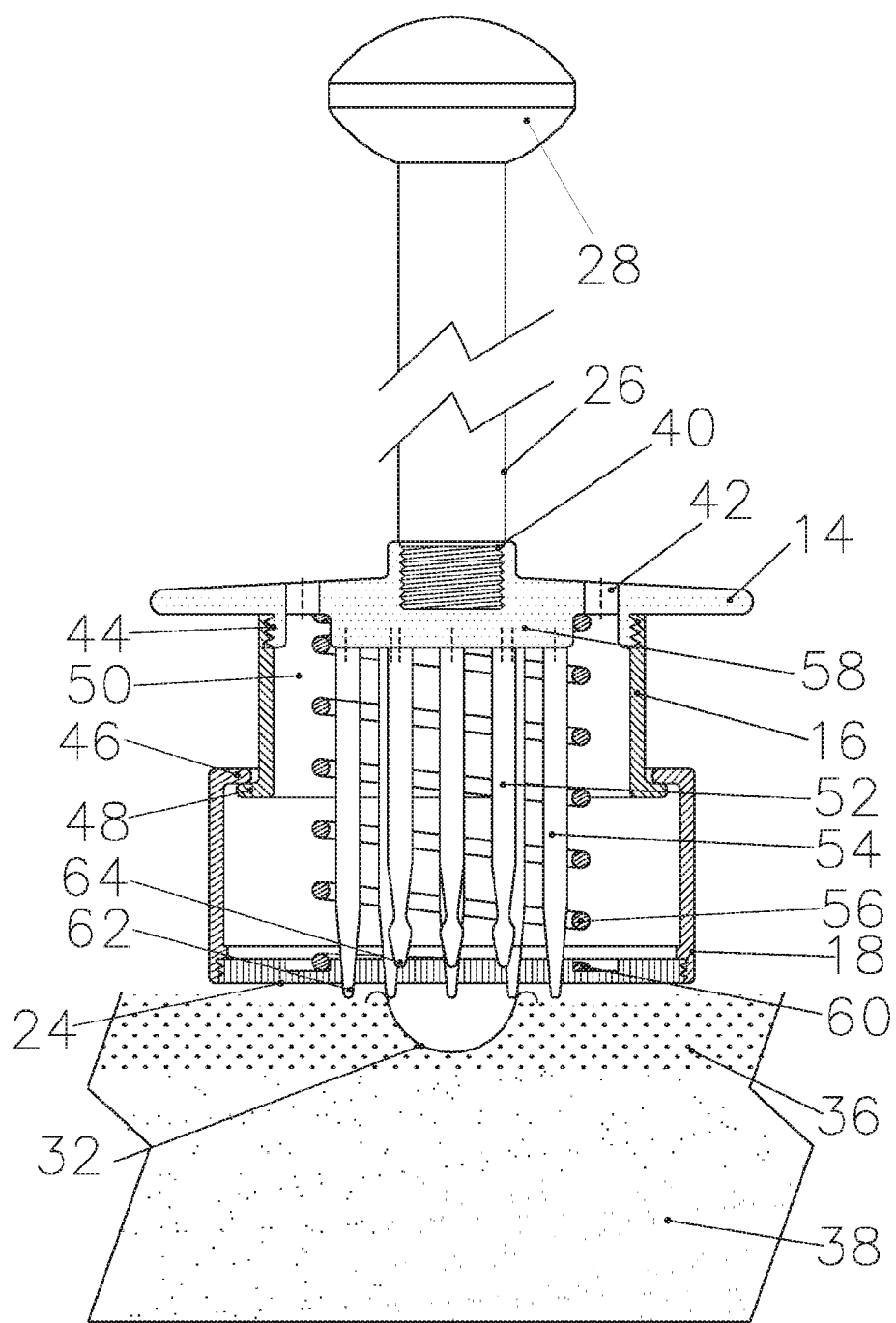
FIG. 4 shows an elevation cross section view of a golf green repair tool set prior to use in a pre-compression mode.

FIG. 4 shows the golf green repair tool in a pre-compression mode where the spring 56 is fully extended biasing the rim 46 of the sleeve 18 against the rim 48 of the housing 16. The spears 52 are retracted into the sleeve 18 and the tines 54 protrude from the base 24 just enough to provide some purchase on the turf 36 to substantially prevent any slippage of the tool during use.

To prepare the device for use, a ball-mark 32 is located on the turf 36 and the base 24 is centered over the ball-mark 32. The base 24 should entirely cover the ball-mark 32 as seen in FIG. 4. The handle 28 on the shaft 26 allows user to more easily move and position the device perpendicular to the surface of the turf. This is verifiable by the golfer/greenskeeper by visually confirming that the base 24 is fully in contact with the turf 36.

Figure 5:
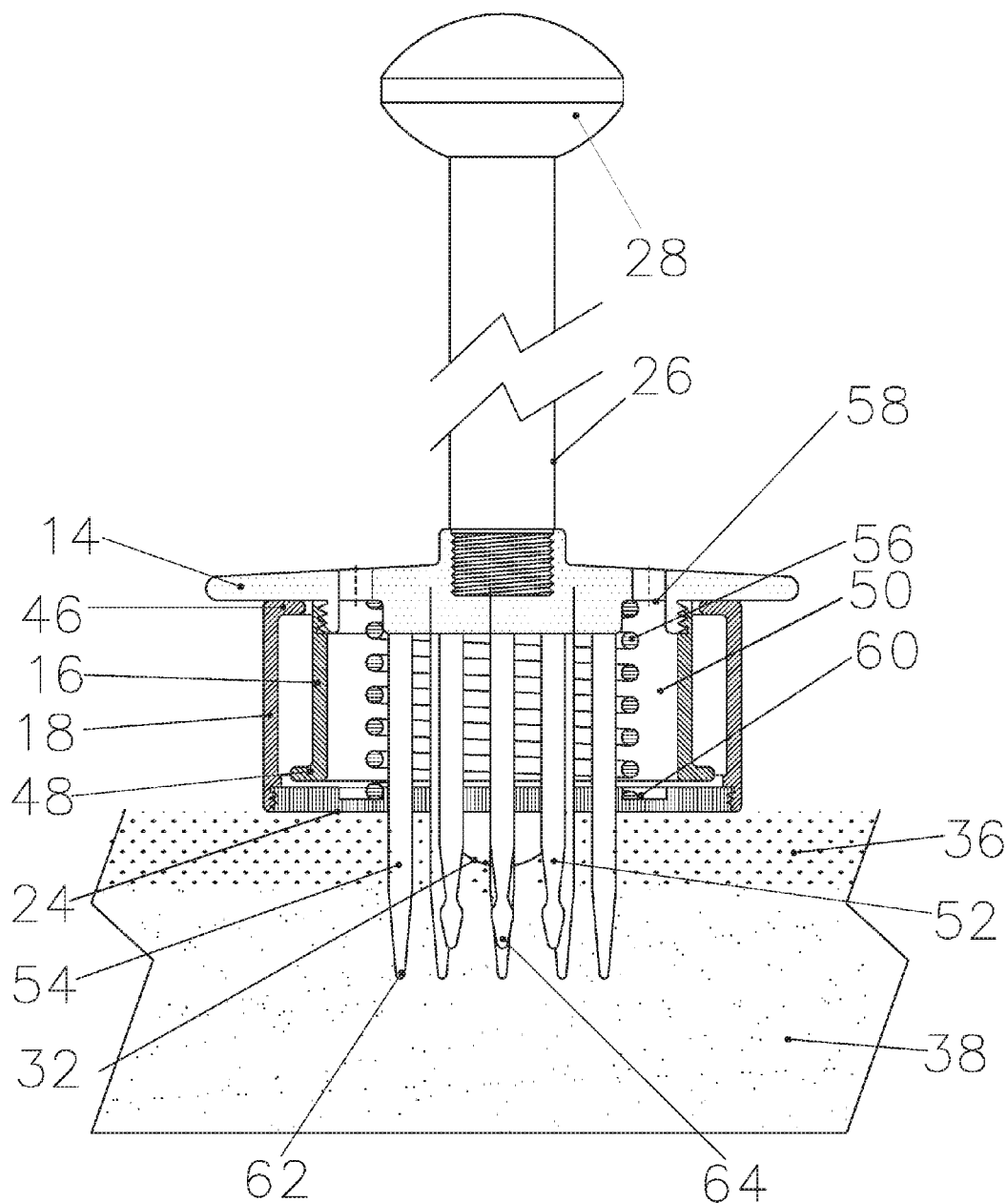
FIG. 5 shows an elevation cross section view of a golf green repair tool inserted into the soil in a compression mode.

Next, as seen in FIG. 5, the golfer/greenskeeper then squarely presses with his/her foot on the cap 14 compressing the spring 56 forcing the housing 16 and the firmly connected to the tines 54 and spears 52 into the turf 36 until the rim 46 of the sleeve 18 bottoms out against the seat 58 of the cap 14. The spears 52 and tines 54 are then at their maximum extension through the turf 36 and into the soil 38. Alternatively or additionally, pressure can be applied at the handle 28 to compress the spring 56 and dive the tines 54 and spears 52 into the turf 36.

When the foot-pressure is applied to the cap 14, as in FIG. 5, the base 24 begins to apply force to the rim 34 surrounding the ball-mark 32. This starts to flatten the rim 34 to become substantially level with the surface of the turf 36.

Figure 6:
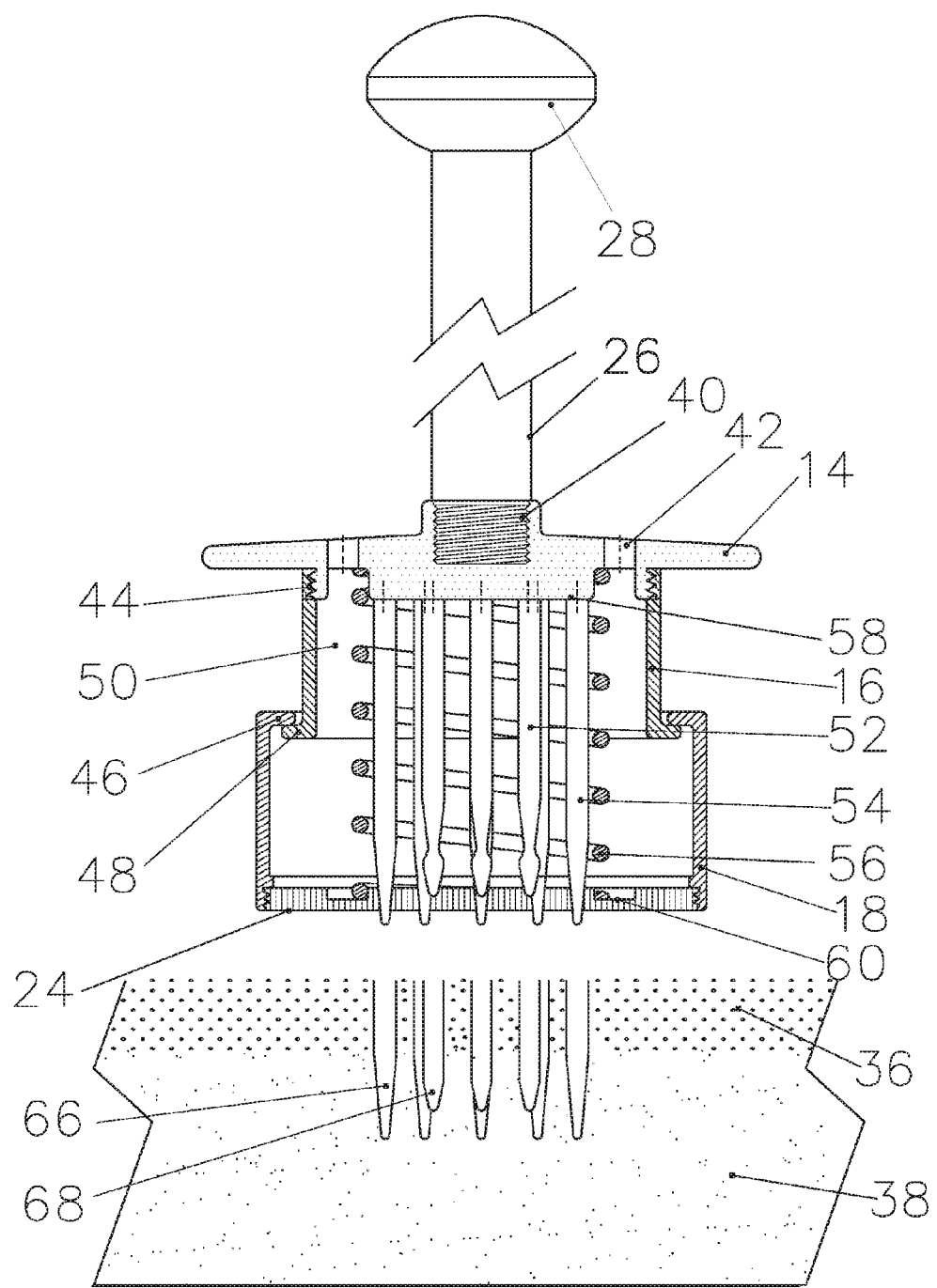
FIG. 6 shows an elevation cross section view of a golf green repair tool immediately after use in a post-compression mode.

FIG. 6 shows an example of a post-compression configuration of the golf green repair tool. The golfer's/greenskeeper's foot has been removed from the cap 14 and the spring 56 bounces open. This retracts the spears 52 and the tines 54 into the interior 50. The rim 46 of the sleeve 18 returns to be seated against the rim 48 of the housing 16.

The base 24 has just been raised a short distance off of the turf 36 to reveal a series of bores 66 created by the spears 52 around the periphery of what was the ball-mark 32. Also left behind are the bores 68 in the turf 36 and soil 38 left by the retraction of the spears 52 in a pattern exactly where the ball-mark 32 formerly was in the turf 36.

Any sand or dirt drawn into the interior 50 throughout the process can be shaken out of the apertures 42, 20, 22 or 70. If ever needed, the cap 14 can be separated from the housing 16 by the threads 44. This also frees the spring 56 and sleeve 18 for disassembly, maintenance and cleaning, if needed. Threads 74 and 73 may also be used to disengage the base 24 from the sleeve 18 for cleaning or repair.

The tines 54 are generally cylindrical and taper to the tips 62 which are generally pointed and conical. The tips 52 may be slightly rounded to avoid injury to both the golfer/greenskeeper and roots and shoots of the turf 36 during use. An important function of the tines 54 is to gently penetrate the turf 36 and soil 38 to aerate and stimulate new growth. This penetration and the resulting bores 66 also loosen the turf 36 and soil 38 to allow the tool to reform the surface of the turf 36 making is flat and smooth with the surrounding turf.

The spears 52 are also generally cylindrical and taper to a tip 64 in the shape of a spear or enlarged cone at the bottom side of the spear 52. Like the tines 54, the spears 52 may have slightly rounded lower ends to avoid cutting the tender grass and roots. The tip 64 on the spears 52 act as a gentle barb that once through the turf 36 can pull up on the turf 36 at the bottom of the ball-mark 32 to raise the bottom of the ball-mark 32 to a level equal to that of the surrounding turf.

As the spears 52 are retracted into the sleeve 18 the tips' 64 light grip on the turf 36 is pulled away thereby freeing the tool from the green onto which it was used to repair.

The number of tines 54 can vary depending on the size of the tool, type of grass and density of the underlying soil 38.

Generally, about six to twenty would be effective. Ten has been found to be particularly effective when encircling around the spears 52. The spears 52 may be provided in quantity between about three to twelve. Six spears 52 have been shown to be effective when centered about the base 24 so that they are in a pattern about the same size as the diameter cross section area of a golf ball so that the width of the ball-mark 32 is covered.

The diameter of the housing 16 is ideally about four inches but may be as small as about two inches or as large as eight inches. The number of tines 54 and spears 52 may be adjusted depending on the size of the housing 16. The handle 28 is typically located at a height suitable for easy grasping by a golfer/greenskeeper, typically about twenty six to thirty six inches. The length of the tines 54 and spears 52 can also vary between about two and eight inches. The length of the tines 54 will control the length of the spring 56 and the available interior 50 when the housing 16 and sleeve 18 are at maximum extension. The tines 54 and spears 52 may be adapted to create bores 66 and 68 of depth between about two and eight inches with about four inches particularly useful.

The parts of the golf green repair tool are generally made of a rigid and corrosion resistant material. Combinations of steel and aluminum alloys have been shown to be effective and perform well. Stainless steel is an effective choice of material. Certain plastics and composites may also be effective. Coil springs made of steel work well for the spring 56 are typically used. The term spring is intended to mean any type of mechanism to bias the housing 16 apart from the sleeve 18 so that the tines 54 and spears 52 are retracted.

The bias strength of the spring 56 may be user changeable. A stronger spring 56 may be preferred in harder soils. Conversely, a softer spring may cause less damage to the turf 36 in softer soils. Generally, the spring should be easily compressed by the foot of the greenskeeper or golfer without causing more injury to the turf 36 by requiring the user to apply excessive force inserting the tines 54 and spears 52.

An important version of the present invention can be fairly described as a golf green repair tool comprise of a cap, a spring, a sleeve, a housing, a handle, a plurality of pointed tines and a plurality of barb-tipped spears. The plurality of spears are affixed to a lower surface of the cap about a center. The plurality of tines are affixed to the lower surface of the cap annularly around the plurality of spears. The spears and tines are perpendicular to the lower surface of the cap. The spring on an upper end seats against the lower surface of the cap extending perpendicular to the lower surface of the cap. The housing is cylindrical and on an upper end is affixed to the lower side of the cap. The sleeve is dimensioned to slidably fit around the housing. The sleeve and the housing share a common axis. The spring on a lower end seats against a base of the sleeve and biases the sleeve away from the cap. A first rim on the lower edge of the housing engages a rim on the upper edge of the sleeve preventing the sleeve from separating from the housing. When the spring is uncompressed the spears are substantially (completely or almost completely) withdrawn into an interior bounded by the cap and base of the sleeve. The base of the sleeve is planar and has a plurality of apertures commensurate with the number of tines and spears that are positioned one each corresponding to the spears and tines so that the spears and tines can pass through the apertures. When the spring is compressed the rim on the upper edge of the sleeve moves to seat against the bottom surface of the cap thereby exposing the length of the spears and tines only linearly perpendicular to the base of the sleeve. The tines each have a tapered tip on a lower end. The spears each have a conical barbed tip below a tapered lower side.

An important variation of the invention can be fairly described as a method of repairing ball-marks in a golf green using any version of the golf green repair tool where a bottom surface of the base of the sleeve is centered over a ball-mark in a turf. Pressure is applied to an upper surface of the cap causing the spring to compress and the tines are inserted into the turf around a periphery of the ball-mark while the spears are inserted into the ball-mark in the turf. The bottom surface of the base depresses a rim around the ball-mark returning the rim to a level of a surrounding turf. Pressure is removed from the upper surface of the cap causing the spring to expand withdrawing the tines from the turf leaving a bore for each tine and withdrawing the spears from the ball-mark drawing up a bottom of the ball-mark to a level of the surrounding turf.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A golf green repair tool comprise of a cap, a spring, a sleeve, a housing, a handle, a plurality of tines and a plurality of spears;
   the plurality of spears are affixed to a lower surface of the cap about a center;
   the plurality of tines are affixed to the lower surface of the cap annularly around the plurality of spears;
   the spears and tines are perpendicular to the lower surface of the cap;
   the spring on an upper end seats against the lower surface of the cap extending perpendicular to the lower surface of the cap;
   the housing is cylindrical and an upper end is affixed to the lower side of the cap;
   the sleeve is dimensioned to slidably fit around the housing;
   the spring on a lower end seats against a base of the sleeve and biases the sleeve away from the cap;
   a first rim on the lower edge of the housing engages a rim on the upper edge of the sleeve preventing the sleeve from separating from the housing;
   when the spring is uncompressed the spears are substantially withdrawn into an interior bounded by the cap and base of the sleeve;
   the base of the sleeve is planar and has a plurality of apertures commensurate with the number of tines and spears that are positioned one each corresponding to the spears and tines;
   when the spring is compressed the rim on the upper edge of the sleeve moves to seat against the bottom surface of the cap thereby exposing the length of the spears and tines only linearly perpendicular to the base of the sleeve;
   the tines each have a tapered tip on a lower end;
   the spears each have a conical barbed tip below a tapered lower side.

2. A method of repairing ball-marks in a golf green using the golf green repair tool in claim 1 where a bottom surface of the base of the sleeve is centered over a ball-mark in a turf;
   pressure is applied to an upper surface of the cap causing the spring to compress and the tines are inserted into the turf around a periphery of the ball-mark while the spears are inserted into the ball-mark in the turf;

the bottom surface of the base depresses a rim around the ball-mark returning the rim to a level of a surrounding turf;

pressure is removed from the upper surface of the cap causing the spring to expand withdrawing the tines from the turf leaving a bore for each tine and withdrawing the spears from the ball-mark drawing up a bottom of the ball-mark to a level of the surrounding turf.

* * * * *